(No Model.)
C. N. ROBINSON.
TOOL FOR REMOVING SECTIONS FROM SCYTHE BARS, &c.
No. 590,023. Patented Sept. 14, 1897.
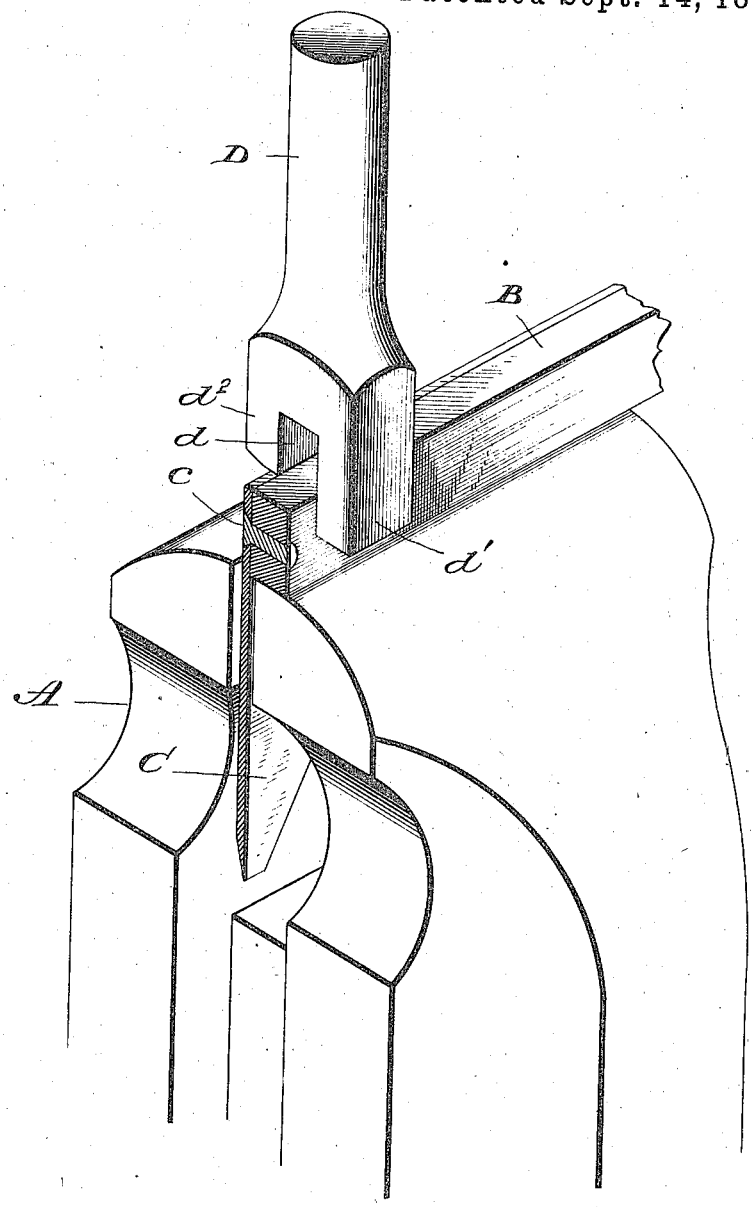
WITNESSES:
L. S. Elliott.
D. L. Rice.
INVENTOR
Carl N. Robinson
by Eugene W. Johnson
his attorney.

United States Patent Office.

CARL N. ROBINSON, OF PAWLET, VERMONT.

TOOL FOR REMOVING SECTIONS FROM SCYTHE-BARS, &c.

SPECIFICATION forming part of Letters Patent No. 590,023, dated September 14, 1897.

Application filed July 22, 1897. Serial No. 645,520. (No model.)

*To all whom it may concern:*

Be it known that I, CARL N. ROBINSON, a citizen of the United States of America, residing at Pawlet, in the county of Rutland and State of Vermont, have invented certain new and useful Improvements in Tools for Removing Sections from Scythe or Sickle Bars; and I do hereby declare the following to be a full, clear, and exact description of the invention, such as will enable others skilled in the art to which it appertains to make and use the same, reference being had to the accompanying drawing, and to letters of reference marked thereon, which forms a part of this specification.

This invention relates to certain new and useful improvements in tools for removing sections from scythe or sickle bars, the object of my improvement being to provide a cheap, simple, and effective tool of such construction that it may be used in connection with a vise or other support for removing the knives or sections from scythe or sickle bars of reapers or mowers without liability of bending the scythe-bar, the device acting as a punch or driver which will force the knife or section from the scythe or sickle bar and while so doing will sever the rivets which connect the parts.

In the accompanying drawing, which illustrates my invention, the figure is a perspective view showing the tool and manner of supporting the scythe or sickle bar to be operated upon.

A refers to a suitable support, which in practice may be a vise, and upon the same the scythe or sickle bar comprising the bar and knife sections are placed, so that the bar B will rest upon one of the jaws of the vise and the knives or sections C depend between said jaws, so that the knives will be maintained in a vertical position. The scythe or sickle bar and the sections or knives are held in engagement with each other by rivets $c$.

The scythe or sickle bar B is usually made of soft steel while the sections are of hard or tempered steel and the rivets of Norway iron, and the usual method of removing the sections from the bar is by the use of a cold chisel or punch. This manner of removing the rivets is objectionable, as the bar is usually placed flat and the metal being of less strength in one direction than the other the bar is liable to be bent. With my improved tool the liability of bending is avoided and the knives or sections can be removed rapidly without injury either to the sections or to the scythe or sickle bar.

D refers to the tool or implement, which is made up of a single piece of metal and is provided with a recess $d$, the portions on each side of the recess being of different lengths, one part, $d'$, being substantially the same length as the width of the scythe or sickle bar, while the other portion, $d^2$, is considerably shorter. The part $d^2$ has its lower end flattened for engagement with the straight edge of the section, and the upper portion of the tool is made after the manner of a punch.

In operation the scythe or sickle bar with the knives or sections thereon is supported by a vise. The tool is then placed over the scythe or sickle bar and the section thereon above one of the rivets. Now by hammering upon the upper end of the tool the section will be forced downward and will sever the rivets. The depending member $d'$ of the tool will serve as a guide, so that the tool will not slip off in use.

I claim—

1. A tool or implement for removing knives or sections from scythe or sickle bars comprising a body portion having at one end a recess and side portions $d'$ $d^2$ one of said side portions being longer than the other, substantially as shown.

2. A tool or implement for removing knives or sections from scythe or sickle bars consisting of a body portion provided at one end with a depending part or guide, a transverse slot or recess of substantially the same width as the scythe or sickle bar and a depending part for engagement with the straight edge of the knife or section, for the purpose set forth.

In testimony whereof I affix my signature in presence of two witnesses.

CARL N. ROBINSON.

Witnesses:
JAMES N. ROBINSON,
H. L. MANCHESTER.